Feb. 19, 1963  R. G. CRAIG  3,077,744
RECOVERY OF C₅ DIOLEFINS
Filed July 1, 1960  2 Sheets-Sheet 2

INVENTOR.
Robert G. Craig
BY
William Klabunde
ATTORNEY.

3,077,744
RECOVERY OF C₅ DIOLEFINS
Robert G. Craig, Wilmington, Del., assignor to Air Products and Chemicals, Inc., a corporation of Delaware
Filed July 1, 1960, Ser. No. 40,204
11 Claims. (Cl. 62—24)

The present invention relates to separation of products obtained by dehydrogenation of a $C_5$ hydrocarbon fraction and is particularly concerned with concentration and/or recovery of isoprene.

By the dehydrogenation of isopentane under suitable conditions to form isoprene, there is obtained in addition to the desired product a mixture of various saturated and unsaturated $C_5$ hydrocarbons in addition to some lower molecular weight cracked products. Since isoprene boils at about 93° F., the fraction containing this material is readily freed from $C_4$ and lower hydrocarbons by simple distillation of the latter. The principal materials in the dehydrogenation effluent from the standpoint of quantity present are, in addition to isoprene, unconverted isopentane, isopentenes, normal $C_5$ mono-olefins and normal $C_5$ diolefins as well as a small but troublesome quantity of cyclodiolefin. Of these, difficulty is had in separation of those components which either boil close to isoprene, those which have a normal relative volatility approximate unity, or which form with isoprene or with other hydrocarbons in the mixture azeotropic compositions which interfere with their separation by ordinary distillation. By simple fractional distillation, there can be separated from the $C_5$ dehydrogenation product: isopentane, 3-methyl butene-1, and pentadiene-1,4 as well as part of the normal pentenes and isopentenes. The isoprene fraction, however, will also contain n-pentane, piperylene, cyclopentadiene, with the remaining normal (pentene-2) and isopentenes (2 methyl butenes), which components can be separated therefrom only by complex and expensive methods. Moreover, the high reflux ratios required to obtain narrow boiling fractions necessitate prolonged heating of the charge with resulting degradation of product by polymerization or otherwise. Because of the inherent disadvantages of fractional distillation, there have been proposed for this separation methods using selective absorbents, extraction with selective solvent, extractive distillation with selective solvents, and combinations of these.

In accordance with the present invention, a novel process is provided for separation and recovery of isoprene from its mixtures with other accompanying $C_5$ hydrocarbons. This method involves the use of fractional freezing to provide a purified isoprene fraction substantially freed of contaminants such as piperylene and cyclo-pentadiene on the one hand and separated from isopentane and iso-amylenes which latter can be usefully recycled to dehydrogenation for production of further isoprene.

In accordance with one preferred embodiment of the invention, the effluent from dehydrogenation after suitable quenching and cooling, is treated in known manner to remove hydrogen and hydrocarbon materials of 4 carbon atoms and lower. The whole $C_5$ fraction (which may contain some $C_6$ hydrocarbons and trace amounts of $C_4$ hydrocarbons) is then pre-cooled to a temperature of less than —100° F. and passed through a series of cooling zones of successively lower temperatures, fractionally separating out incremental cuts of the mixture in solid form. Further purification of the individual cuts concentrated in isoprene, or of any of the other individual cuts if so desired, can then be effected more readily by methods such as extractive distillation or in other desired manner.

In an alternative embodiment of the invention the $C_5$ dehydrogenation effluent is initially subjected to a rough separation by distillation of an overhead fraction concentrated in isopentane accompanied by most of the lower boiling materials while withdrawing as undistilled bottoms the isoprene and higher boiling components. The thus concentrated isoprene bottoms fraction is then subjected to fractional freezing for separation of successive cuts at selected intervals to obtain a highly concentrated isoprene cut, which, if desired, may be further purified.

The details of operation by the methods of the invention will be understood from the description which follows and from the accompanying drawings, wherein.

Figure 1:
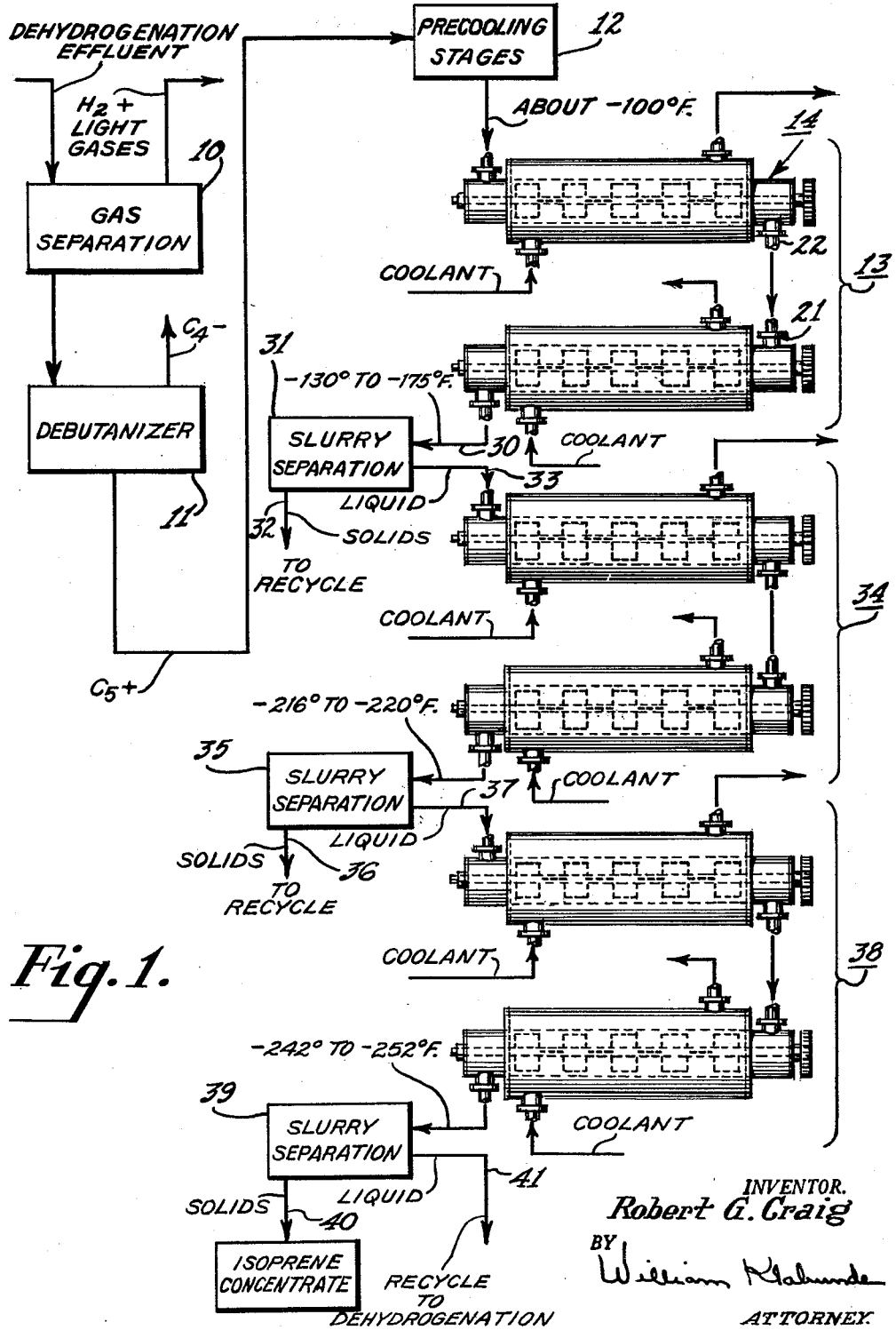
FIGURE 1 is a flow diagram of an embodiment in which the whole $C_5$ fraction from dehydrogenation, after separation of accompanying lighter materials, is subjected to fractional freezing.

Auxiliary equipment, such as heat exchangers, compressors, pumps, etc., which would be conveniently employed in practice, are not illustrated in these drawings.

The dehydrogenated vapor product, such as one obtained by low pressure dehydrogenation over chromia-alumina catalyst of a charge of $C_5$ hydrocarbons—for example isopentane fresh feed which may contain a small amount (say up to about 5%) of normal pentane—is quenched in known manner by contact with cool quench oil and thereby cooled to a temperature in the order of about 100° F. The quenched product is compressed in several stages with intercooling to about 100 p.s.i.a., the temperature in each compression stage being kept sufficiently low to minimize polymer formation. The compressed product is then sent to a flash drum or other liquid-gas separator followed by an absorber, as indicated at 10 in FIGURE 1, for removal of normally gaseous materials, the remaining liquid condensate being sent to a debutanizer as indicated at 11, for removal of $C_4$'s and any remaining lighter gas. The remaining $C_5$ hydrocarbon fraction is then subjected to separation for the production of an isoprene concentrate.

From typical isopentane dehydrogenation operations, the debutanized product from 11 may have an approximate composition illustrated by the following samples:

| | Sample A | | Sample B, Wt. Percent | Freezing Pt., °F. | Normal Boiling Pt., °F. |
|---|---|---|---|---|---|
| | Mol Percent | Wt. Percent | | | |
| Butane | <0.05 | <.02 | 0.2 | −217.0 | 31.1 |
| 3 methyl butene-1 | 1.3 | 1.3 | 1.9 | −271.3 | 68.1 |
| Isopentane | 45.7 | 46.8 | 62.0 | −255.8 | 82.1 |
| 2 methyl butene-1 | 9.4 | 9.4 | 6.5 | −215.6 | 88.0 |
| Isoprene (2-methyl-1,3-butadiene) | 14.3 | 13.9 | 13.5 | −230.8 | 93.3 |
| n-pentenes | 4.0 | 4.0 | 1.9 | | |
| (pentene-1) | | | | −265.4 | 86.0 |
| (cis-pentene-2) | | | | −240.5 | 98.8 |
| (trans-pentene-2) | | | | −220.4 | 97.4 |
| n-pentane | 1.6 | 1.7 | 0.9 | −201.5 | 96.9 |
| 2 methyl butene-2 | 17.1 | 17.1 | 10.8 | −208.8 | 101.3 |
| 1,3 pentadiene (piperylene) | 6.1 | 6.0 | 2.3 | | |
| (cis-pentadiene) | | | | −128.0 | 111.6 |
| (trans-pentadiene) | | | | −128.0 | 103.1 |
| 1,4 pentadiene | | | | −234.0 | 78.9 |
| 3 methyl butadiene-1,2 | | | | −184.0 | 104.0 |
| Other $C_5$ dienes and $C_6$ (cyclo $C_5$ diene) | <0.5 | <0.5 | | −121.0 | 106.7 |

As further illustrated in FIGURE 1, the debutanized product is sent through a series of precooling steps to bring the temperature thereof down to about or short of the freezing point of cyclopentadiene, say to below −100° F., and the cold liquid discharged into the first bank 13 of a series of low temperature exchange coolers. For example, as illustrated in FIGURE 2, each cooler 14 may comprise a pipe 20 provided with fluid inlet 21 and fluid outlet 22 for passing the liquid to be cooled therethrough. Any suitable standard bank cooling equipment may be employed. For example, in the typical system illustrated, a rotating scraper 23, driven by means 24, is provided with spring-loaded blades 25, which sweep the internal wall of the pipe. Each scraper may be directly motor driven or a common chain drive may connect a bank of these to a common power source. The wall film of solids is thus caused to mix with the liquid passing through the pipe, thereby increasing heat-transfer efficiency. Surrounding each cooling pipe is a jacket 26 provided with fluid inlet and outlet 27 and 28 for circulating the cooling medium through the jacket. As the cooling medium there may be employed liquefied gas of suitable low temperature, such as methane, nitrogen, air or oxygen; used cooling fluid being preferably recycled to a preceding cooling step.

Each bank of coolers comprises a sufficient number of units 14 to effect the necessary reduction in temperature required to solidify that component or components of the mixture desired to be removed in each cooling stage. The cooled liquid or resulting slurry is passed in series from the discharge outlet 22 of the preceding cooler 14 to the inlet 21 of the succeeding cooler, while the cooling medium passes in opposite direction between successive coolers, augmented or adjusted if need be by fresh coolant of lower temperature.

Figure 2:
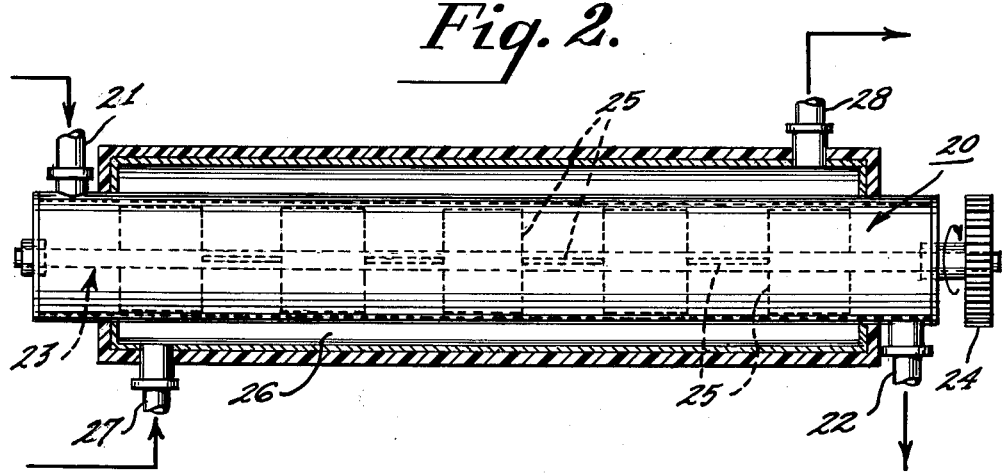
FIGURE 2 is a cross-sectional view, partly diagrammatic, of a preferred form of exchange cooler.

As illustrated in FIGURE 1, for example, in the initial bank of coolers 13 the $C_5$ dehydrogenation mixture is brought to a temperature of about −130° F. or somewhat lower, as down to about −175° F., the temperature being selected to obtain the highest concentration of solidified cyclopentadiene and piperylene while maintaining the methyl butenes in liquid state. The resulting slurry from the last cooler of bank 13 is discharged at 30 into a solids-liquid separator 31. The separation of solids from the liquid may be effected at 31 in any desired manner, such as by centrifuging, decanting, or filtering. The separated solids 32 will be composed chiefly of cyclopentadiene and piperylene, which are removed, and the remaining liquid 33 sent to the next bank of coolers 34.

In the bank of coolers 34, which are constructed in similar manner to those in bank 13, the liquid fraction is then brought to appropriate temperature below −175° F. but no lower than about −225° F. to solidify a fraction having a freezing point above that of isoprene. In the illustrated example, the temperature is reduced in this bank to about −216° F. or preferably somewhat lower, as to about −220° F., and the resulting slurry discharged into a liquid-solids separation 35. The separated solids 36 will be composed chiefly of: 2-methyl butene-1 and 2-methyl butene-2, a smaller amount of n-pentane, and may have some trace amounts of other components, particularly 3-methyl-butadiene-1,2. This solids fraction 36 is concentrated in isoprene precursor materials, and is therefore desirable material to be recycled to dehydrogenation. To limit production of n-diolefins, the n-pentane in the recycle stream may be separated to large extent by fractional distillation, or selective extraction; substantially complete separation of the n-pentane can be achieved but would not warrant the added costs. Moreover, under the dehydrogenation conditions described, the total $nC_5$ (saturates, mono- and diolefin) content of the dehydrogenation effluent is equal to that in the feed (saturates and mono-olefins) when the feed contains about 6% by weight iso $nC_5$ and is predominantly iso $C_5$.

The liquid fraction 37 is sent to the next bank of coolers 38 for freezing out an isoprene-rich concentrate, having the lowest possible content of isopentane. As illustrated, the temperature of the liquid in the bank of coolers 38 is reduced to about −242 to −252° F. and the resulting slurry discharged into a solid-liquid separator 39. The separated solids fraction 40 will contain, under suitable operating conditions, in the order of about 70% or more isoprene, accompanied by a small portion of the normal $C_5$ mono-olefins which were present in the original dehydrogenation effluent and may also contain very small amounts of normal $C_5$ diolefin (pentadiene 1,4).

If further purification of the isoprene concentrate from 40 is desired, the normal $C_5$ diolefin can be largely removed by distillation. For many purposes the presence of small amounts of normal pentenes in the isoprene fraction can be tolerated. If such contamination is not acceptable, these mono-olefins can be separated from the isoprene in known manner by a relatively small extractive distillation unit. The liquid 41, remaining after removal of the isoprene solids fraction at 40, will comprise largely isopentane, and the entire stream 41 may be recycled to dehydrogenation. The other principal component of fraction 41 will be 3 methyl butene-1, which can be also dehydrogenated to isoprene, and is therefore a desirable component for inclusion in the products recycled to dehydrogenation. Possibly also present in fraction 41 may be residual small amounts of n-pentenes not previously removed. While these n-pentenes can be removed from the isopentane concentrate if desired, it will be found more economical to leave the same in the recycled stream 41 for conversion by dehydrogenation. The presence of this small amount of n-pentenes in the recycle charge to dehydrogenation is not necessarily detrimental, since these will build up as such or be converted to $nC_5$ diolefins to a maximum equilibrium level, and the presence of this small amount may be even beneficial in establishing the equilibrium level, thereby reducing the extent of reverse isomerization of iso-$C_5$'s in the fresh charge to the normal compounds.

The isoprene concentrate recovered at 40 may be purified, for example, by extractive distillation with addition of a water-soluble solvent, such as acetone, containing up to about 10% water. The aqueous acetone is added to the distillation charge in an amount sufficient to maintain about 60% or more acetone in the liquid phases of the extraction column at a reflux ratio of about 5/1–8/1. Since most of the 2-methyl butenes will have already been removed in the fraction 36, this purification is readily accomplished in a considerably smaller extractive distillation column. The overhead distillate from extractive distillation will comprise most of the components of the distillation charge except isoprene and will be composed mostly of normal mono-olefins, particularly cis- and trans-pentene-2. The bottoms isoprene fraction is stripped from the solvent and water washed to provide a purified isoprene product of 97–98% or higher purity satisfying standard quality specifications. The isoprene recovery loss can be kept to no more than 2 to 3%, depending on distillation and stripping efficiencies.

Figure 3:
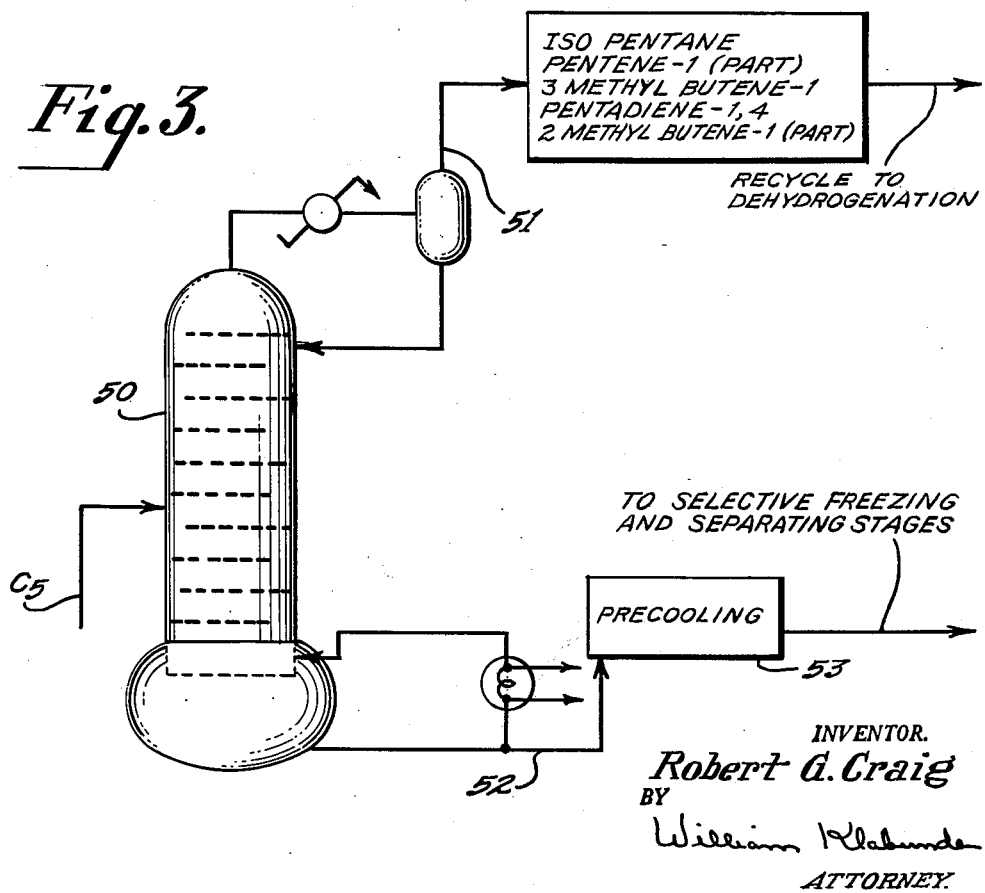
FIGURE 3 is a flow diagram of an alternative embodiment of the process utilizing a pre-fractionation step for partial separation of the $C_5$ fraction.

In the embodiment illustrated in FIGURE 3, the debutanized $C_5$ cut, which is similar to that discharged at 11 in FIGURE 1, is distilled, preferably under pressure of about 30 p.s.i.a., in a column 50 to provide an overhead vapor fraction 51 and a liquid bottoms fraction 52. The overhead fraction will be composed of those $C_5$ materials having an atmospheric boiling point of up to about 85° F. and will include, in addition, a portion of the pentene-1 and 2-methyl butene-1, the remaining portion of these being contained in the liquid phase removed as bottoms. The bottoms fraction 52 is pre-cooled at 53 to below about −100° F. in the same manner as previously explained in connection with the embodiment at FIGURE 1, and passed through the several cooling and separating stages in the manner there described. Thus, from the first bank of coolers 13 and separation 31, there will be removed, as before, solidified cyclopentadiene and piperylene. By the second cooling stage 34 and separation 35, there will be removed the valuable isoprene precursors including methyl butenes, as before, which may be recycled to further dehydrogenation. The isoprene-rich fraction is separated at 40 from the slurry produced in the third cooling stage 38. Since the isopentane has already been recovered in the initial distillation at 51, the liquid remaining from the last separation of the slurry at 39 will be composed chiefly of the remaining pentene-1 and possibly some 3 methyl butene-1. Although the 3 methyl butene-1 can be converted to isoprene, it would not ordinarily be recycled to the dehydrogenation operation because operating costs would not warrant the required separation. While in the case of the embodiment in FIGURE 1 the choice of the cut point involves a compromise to afford highest isoprene recovery with minimum carryover of isopentane into the isoprene fraction recovered at 40, this consideration is of no real consequence in the embodiment of FIGURE 2, so that in the latter embodiment a lower freezing level may be utilized in the bank of coolers 38, say to about −260° F. for assuring fuller recovery of the isoprene.

In the construction of the apparatus operating at the low temperatures in the range described, there are a number of alloys available. Among these are: stainless steel type 304, low carbon steels containing about 8% Ni, various austenitic alloys containing Cr and Ni; aluminum and brass, respectively, also can be used.

While the practice of the invention has been exemplified with particular reference to the separation of isoprene from a product obtained by dehydrogenation of a $C_5$ hydrocarbon fraction containing over 10% isoprene, the application is not limited thereto. The described operation, it will be understood, is likewise useful in the recovery of isoprene concentrates, or concentrates of other desired components from other mixed $C_5$ hydrocarbon fractions containing 10 or more percent of the desired component, such as those hydrocarbon products obtained by steam cracking of a gas oil, or in other known manner. While the emphasis herein has been placed on the recovery of isoprene as the desired end product, the novel technique utilized may be employed in the recovery or concentration of other desired components of a mixed $C_5$ hydrocarbon stream, for example, in recovering the piperylene from dehydrogenation of a charge rich in n-pentane. Although the invention can be practiced for recovery of a desired component present in smaller proportions, it is not believed economically desirable to utilize the same for recovery as principal product of components present in less than about 10 mol percent of the charge subjected to fractional freezing.

In a further modification of the embodiment illustrated in FIGURE 3, the initial debutanized charge may be fractionated by extractive distillation to provide a bottoms extract fraction containing chiefly diolefins (90% by weight or more) accompanied by a small portion of 2 methyl butene-2, an overhead vapor fraction containing chiefly paraffins and mono-olefins. The diolefin liquid fraction in typical separation by extractive distillation with aqueous acetone may comprise, after stripping from the solvent:

|  | Sample A, Wt. Percent | Sample B, Wt. Percent |
| --- | --- | --- |
| Isoprene | 66.3 | 82.4 |
| Piperylenes | 29.0 | 13.9 |
| Cyclopentadiene | 0.5 | 0.6 |
| 2 methyl butene-2 | 3.8 | 2.8 |
| $nC_5$ mono-olefins ±3 methyl 1,2 butadiene, etc. | 0.4 | 0.3 |

By subjecting the above isoprene rich concentrate to freezing at suitable temperature, separation of piperylenes and cyclopentadiene is readily effected. By lowering the temperature of the concentrate to a temperature in the range of −135° F. to −220° F., practical separation and removal of the cyclopentadiene and piperylene can be achieved with little, if any, significant loss of isoprene. The 2-methyl butene-2, the mono-olefins and any methyl butadiene 1,2 present, will distribute between solid and liquid phases depending upon the selected freezing temperature, which temperature selection will be governed largely by choice of degree of isoprene purity desired at the expense of accompanying reduction in yield.

Instead of freezing the total diolefin extract fraction from extractive distillation, this product, after being stripped from the solvent, may be distilled in a simple column (splitter) to effect separation between an isoprene overhead and a bottoms cut of piperylenes. Any cyclopentadienes carried over in the overhead can then be removed by freezing below about −125° to −130° F. and considerably above the freezing point of the isoprene.

Obviously many modifications and variations of the present invention as hereinbefore set forth may be made without departing from the spirit and scope thereof and therefore only such limitations should be imposed as are indicated in the appended claims.

What is claimed is:

1. The method of recovering a desired $C_5$ conjugated diolefin from a hydrocarbon mixture containing the same in admixture with closely boiling hydrocarbons of the same number of carbon atoms per molecule, which method comprises cooling such mixture in successive stages to suitable temperatures to solidify components present therein having a freezing point of at least 5° F. higher than the desired component, removing from the resulting liquid slurry the solids present therein, further cooling the solids-freed fraction to at least the freezing point and to no more than about 20° F. below the freezing point of the desired conjugated diolefin, thereby forming a liquid slurry containing the desired component, separating the solids from the liquid slurry, thereby recovering a concentrated solids fraction containing the desired conjugated diolefin, liquefying the recovered solids fraction to obtain a liquid concentrate and fractionating the liquid concentrate by distillation with the recovery of a distillate cut at the approximate boiling point of the desired diolefin.

2. The method according to claim 1 in which said hydrocarbon mixture contains isoprene which is recovered as the desired diolefin.

3. The method of claim 1 in which said hydrocarbon mixture is at least part of the reaction product obtained by dehydrogenation of isopentane, which part contains isoprene, and such isoprene is recovered as the desired conjugated diolefin.

4. The method according to claim 3 wherein said hydrocarbon mixture is one obtained by distillation of the reaction product produced by dehydrogenation of isopentane and from which product at least the major portion of the isopentane has been removed by said distillation.

5. The method of recovering isoprene which comprises dehydrogenation of a $C_5$ hydrocarbon charge rich in isopentane under conditions favoring substantial production of isoprene from such charge, removing substantially all $C_4$ hydrocarbons and lower boiling materials from the dehydrogenated product to obtain a $C_5$ hydrocarbon fraction, pre-cooling said $C_5$ fraction to a temperature below −100° F., passing the precooled material through at least one cooling zone at a temperature sufficiently low to freeze out at least a portion of the mono-olefins but above the freezing point of isoprene, thereby forming a liquid slurry containing mono-olefins in solidified state, separating solids from said slurry, liquefying the solids thus separated and returning at least a portion thereof to dehydrogenation, said returned portion including mono-olefins which are dehydrogenatable to isoprene, further cooling the remaining liquid in the solids-freed slurry to a temperature below that of isoprene but above that of isopentane, thereby effecting formation of a slurry containing isoprene in solidified state, separating and recovering an isoprene-rich solids cut from said last-named slurry, and returning at least a portion of the remaining liquid to dehydrogenation, said returned portion including isopentane.

6. The method according to claim 5 wherein said precooled material is separated by successive fractional freezing to produce at least two separate cuts of solids freezing above isoprene, one of said cuts being taken at a temperature in the range of −130° to −175° F., and another of said cuts being taken at a lower temperature but short of −225° F.

7. The method according to claim 5 wherein said cooling of the liquid to produce the slurry containing isoprene solids is carried out at a temperature in suitable range to provide a separable solids fraction therein containing about 70% or more isoprene.

8. The method according to claim 7 wherein the said isoprene-containing solids fraction is purified for recovery of isoprene by extractive distillation.

9. The method of recovering concentrated isoprene from the product obtained from dehydrogenation of an isopentane-containing $C_5$ charge, which method comprises removing from the dehydrogenated product $C_4$ and lighter materials, distilling the remaining $C_5$ cut at superatmospheric pressure to remove an overhead fraction rich in isopentane and recovering a liquid bottoms fraction containing at least 10% isoprene, pre-cooling said liquid to a temperature below about −100° F., further cooling the liquid in successive cooling stages to effect respectively the solidification of (1) piperylene, (2) mono-isoolefins solidifying above the freezing point of isoprene, and (3) isoprene, withdrawing the liquid slurry produced at each of said cooling stages, separating liquid from solids in each said slurry and returning the solids-freed liquid to the next successive cooling stage except for the last such separation, and recovering from such last-named separation as solids product a fraction concentrated in isoprene and free of significant isopentane.

10. The method of recovering isoprene contained in a $C_5$ hydrocarbon mixture including piperylenes, which method comprises subjecting such mixture to selective fractionation to separate the same into at least two fractions, one of said fractions being composed chiefly of diolefins including isoprene and piperylenes, freezing said diolefin fraction to a temperature below −135° F. but above −220° F. to effect solidification of said piperylenes thereby forming a slurry including said piperylenes as solids, separating the solids from said slurry to effect the removal of piperylenes therefrom, and recovering the remaining liquid comprising isoprene.

11. The method of recovering isoprene contained in a $C_5$ hydrocarbon mixture including piperylenes, which method comprises subjecting such mixture to selective fractionation to separate the same into at least two fractions, one of said fractions being composed chiefly of diolefins including isoprene and piperylenes, distilling said diolefin fraction at a temperature effective in vaporizing isoprene, thereby separating such isoprene from piperylene remaining as liquid bottoms, recovering the vapor overhead from such distillation and subjecting the same to freezing at a temperature below −125° F. but above −220° F. to form a slurry containing cyclopentadienes as solids, separating out said solids and recovering the remaining liquid product comprising isoprene.

References Cited in the file of this patent
UNITED STATES PATENTS

| | | |
|---|---|---|
| 2,022,165 | Twomey | May 9, 1934 |
| 2,258,015 | Keith | Oct. 7, 1941 |
| 2,344,969 | Claffey | Mar. 28, 1944 |
| 2,353,234 | Hachmuth | July 11, 1944 |
| 2,852,517 | Lynn | Sept. 16, 1958 |
| 2,857,745 | Lipscomb et al. | Oct. 28, 1958 |